US009994190B2

(12) United States Patent
Izuma

(10) Patent No.: US 9,994,190 B2
(45) Date of Patent: Jun. 12, 2018

(54) GAS GENERATOR

(71) Applicant: Daicel Corporation, Osaka-shi, Osaka (JP)

(72) Inventor: Toshihiro Izuma, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days. days.

(21) Appl. No.: 15/323,680

(22) PCT Filed: Jul. 21, 2015

(86) PCT No.: PCT/JP2015/070635
§ 371 (c)(1),
(2) Date: Jan. 3, 2017

(87) PCT Pub. No.: WO2016/017465
PCT Pub. Date: Feb. 4, 2016

(65) Prior Publication Data
US 2017/0166160 A1 Jun. 15, 2017

(30) Foreign Application Priority Data

Aug. 1, 2014 (JP) .................................. 2014-157323

(51) Int. Cl.
*B60R 21/261* (2011.01)
*B60R 21/264* (2006.01)
(Continued)

(52) U.S. Cl.
CPC ............... *B60R 21/264* (2013.01); *B01J 7/00* (2013.01); *B60R 21/261* (2013.01); *B60R 2021/26029* (2013.01); *B60R 2021/2642* (2013.01)

(58) Field of Classification Search
CPC ... B60R 21/261; B60R 21/26; B60R 21/2644; B60R 2021/2642
See application file for complete search history.

(56) References Cited

U.S. PATENT DOCUMENTS

| 5,984,351 A | 11/1999 | Pierotti et al. |
| 6,315,322 B1 | 11/2001 | Mika |

(Continued)

FOREIGN PATENT DOCUMENTS

| JP | 8-156737 A | 6/1996 |
| JP | 2005-199867 A | 7/2005 |

(Continued)

*Primary Examiner* — Faye M Fleming
(74) *Attorney, Agent, or Firm* — Birch, Stewart, Kolasch & Birch, LLP

(57) ABSTRACT

The present invention provides a gas generator including a combustion chamber cup which is disposed in the housing provided with a gas discharge port and includes a combination of a cup member and a cylindrical member, a combustion chamber being separated by the combustion chamber cup into an inner combustion chamber and an outer combustion chamber, the cup member having, in a circumferential wall surface thereof, a dropout-preventing slit formed in an axial direction from a first end on the side of a bottom surface to a second end on the side of an opening and a plurality of through holes formed in a circumferential direction, the cylindrical member having a first end opening fixed to a bottom plate of the housing and a protrusion protruding radially outward in a circumferential wall surface thereof, the cup member covering a second end opening of the cylindrical member, and the bottom surface of the cup member being positioned on the side of a top plate of the housing, the plurality of the through holes being closed when the protrusion of the cylindrical member is fitted at the first end of the dropout-preventing slit, at the time of actuation, the plurality of the through holes of the cup member being opened when the cup member moves until the protrusion, which has located at the first end of the dropout-preventing slit, abuts against the second end.

17 Claims, 7 Drawing Sheets

(51) Int. Cl.
*B01J 7/00* (2006.01)
*B60R 21/26* (2011.01)

(56) References Cited

U.S. PATENT DOCUMENTS

| | | |
|---|---|---|
| 7,374,204 B2 | 5/2008 | Hoffman et al. |
| 8,459,187 B2 * | 6/2013 | Nakayasu ............. B60R 21/261 |
| | | 102/367 |
| 9,353,703 B2 * | 5/2016 | Kobayashi ................ F42B 3/04 |
| 2005/0200107 A1 | 9/2005 | Matsuda et al. |
| 2007/0120349 A1 | 5/2007 | Hoffman et al. |
| 2011/0239891 A1 | 10/2011 | Nakayasu |
| 2013/0283760 A1 * | 10/2013 | Kobayashi ................ F42B 3/04 |
| | | 60/39.12 |

FOREIGN PATENT DOCUMENTS

| | | | |
|---|---|---|---|
| JP | 2009-517263 A | 4/2009 | |
| JP | 2009-137478 A | 6/2009 | |
| JP | 2011-207326 A | 10/2011 | |
| JP | 2013226889 A * | 11/2013 | ............... F42B 3/04 |
| WO | WO 2007/064423 A2 | 6/2007 | |

* cited by examiner

[Fig. 1]
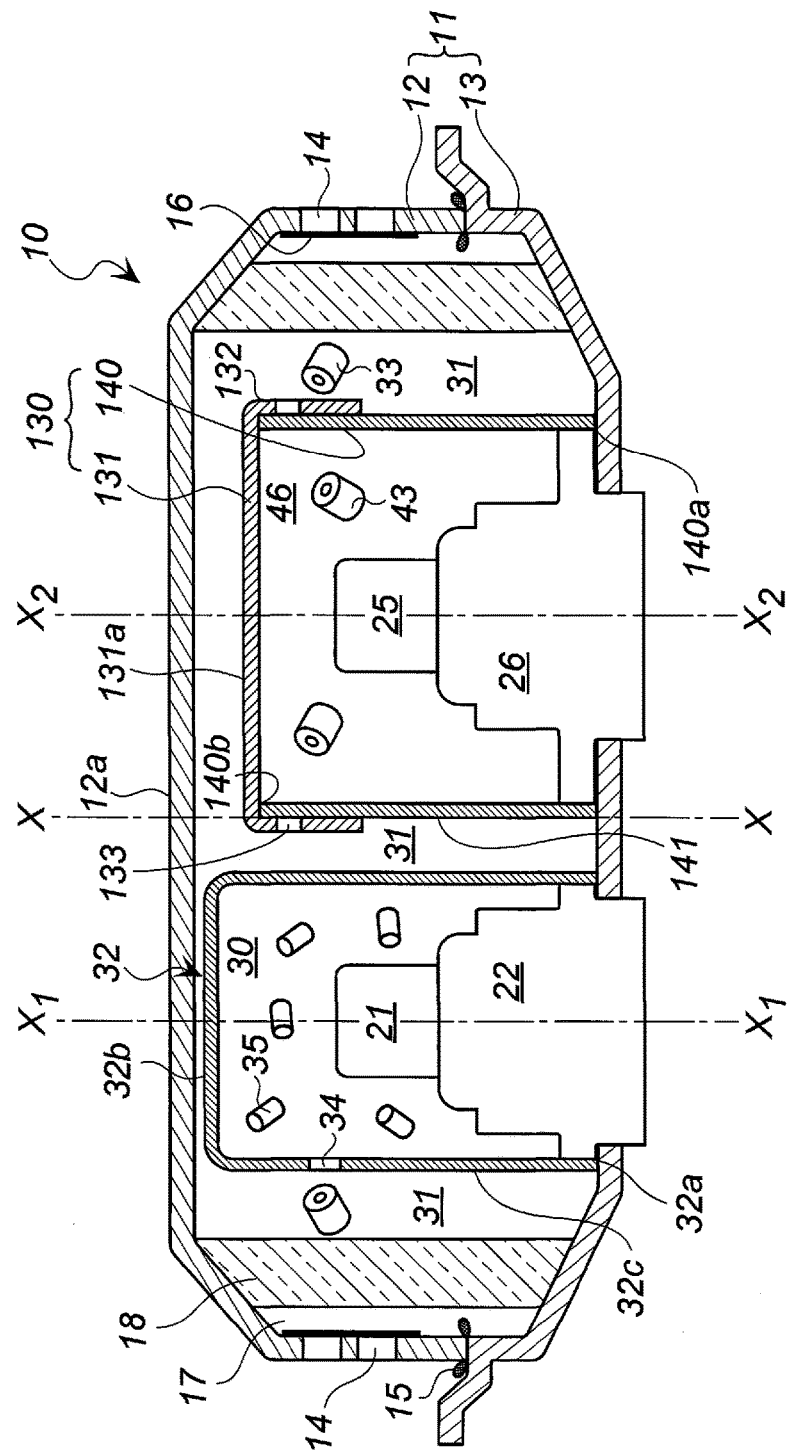

[Fig. 2]
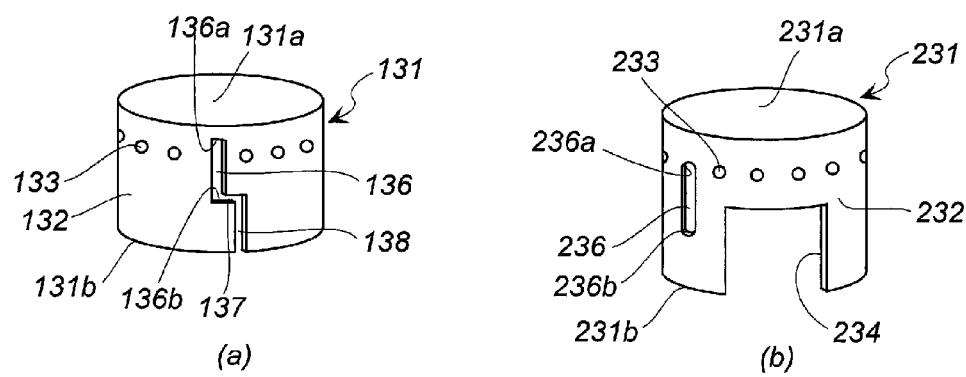
[Fig. 3]
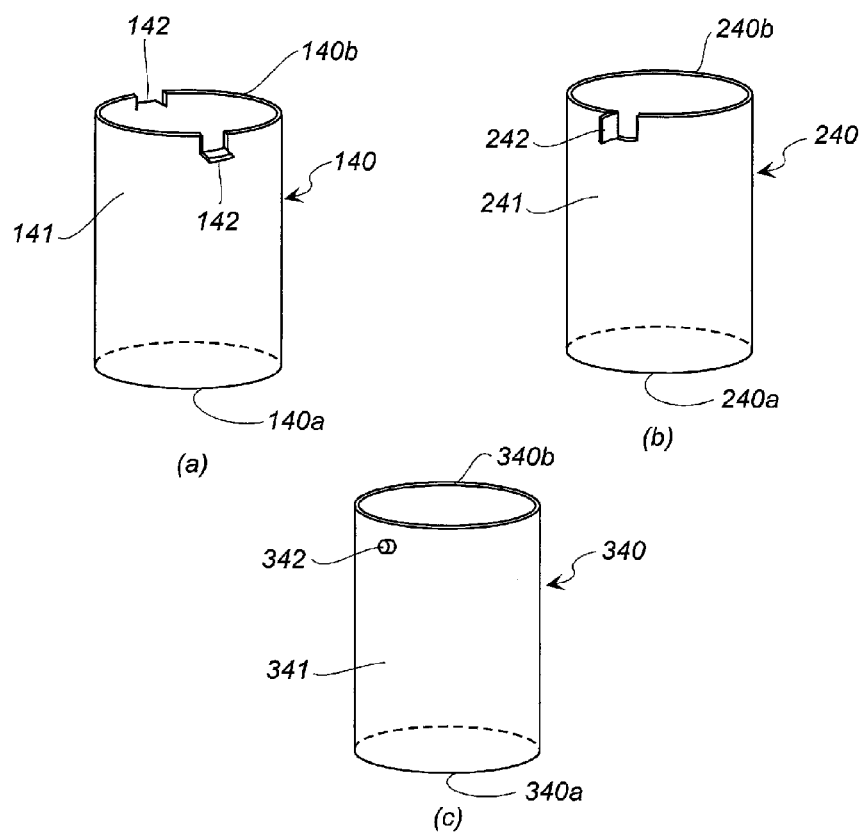

[Fig. 4]
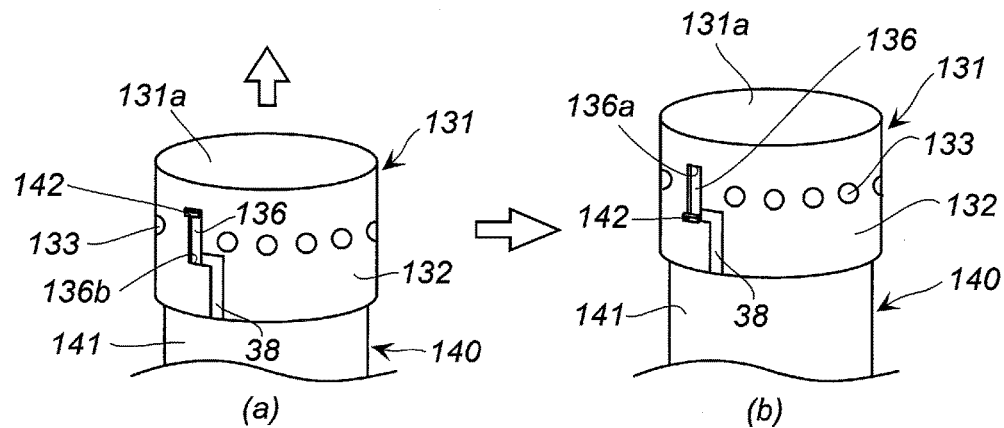
[Fig. 5]
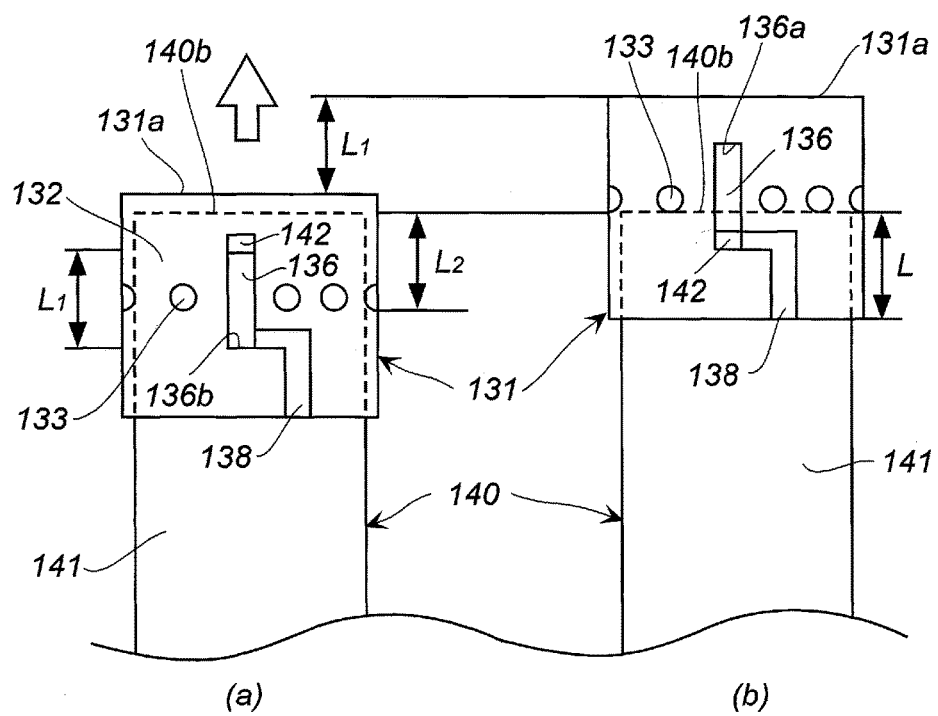

[Fig. 6]
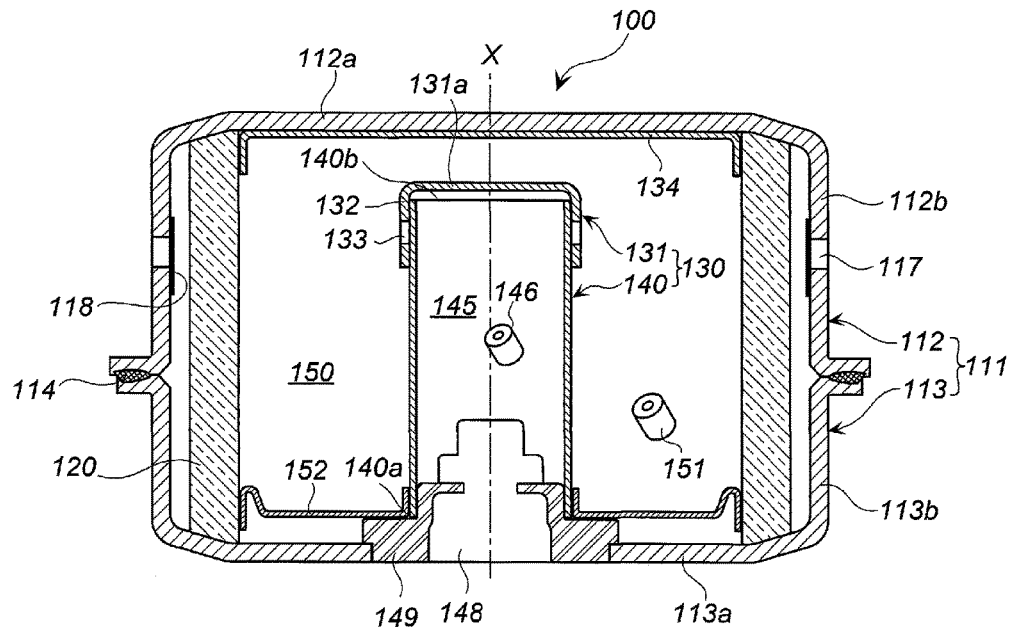
[Fig. 7]
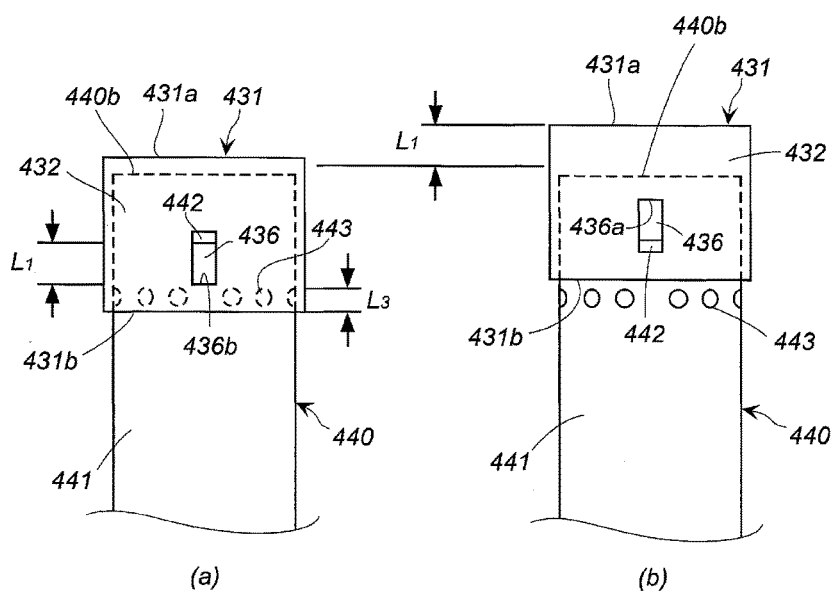
(a)          (b)

[Fig. 8]
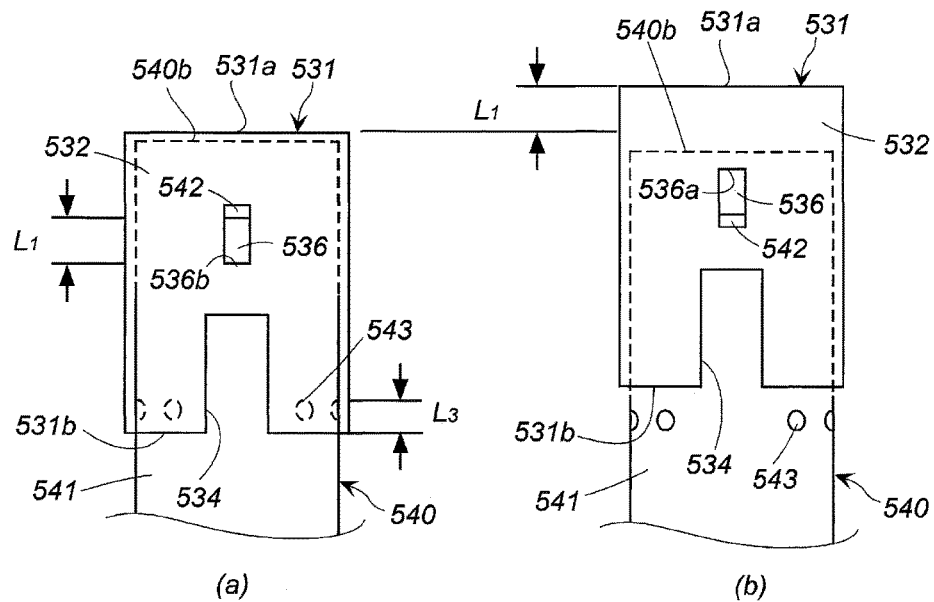
[Fig. 9]
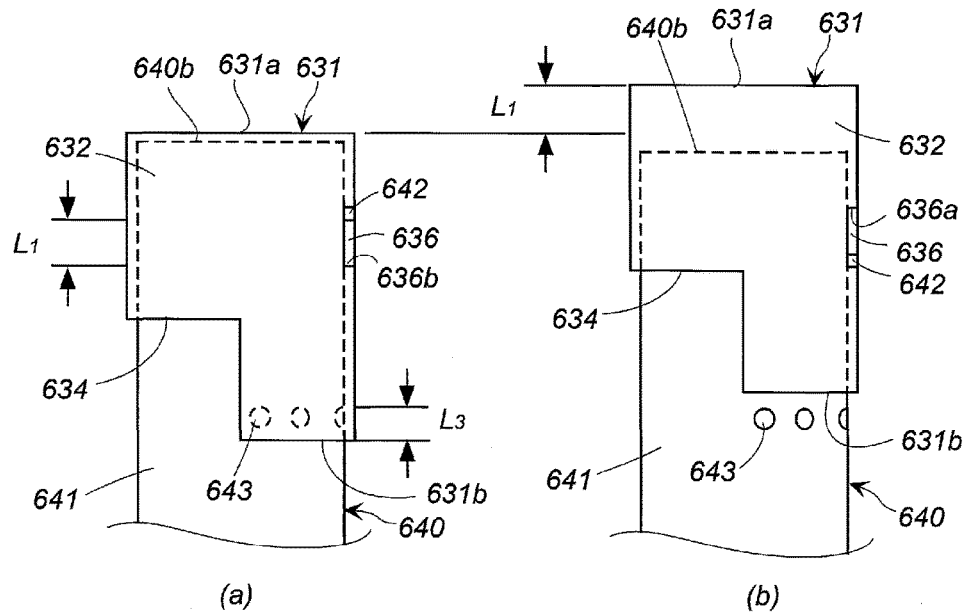

[Fig. 10]
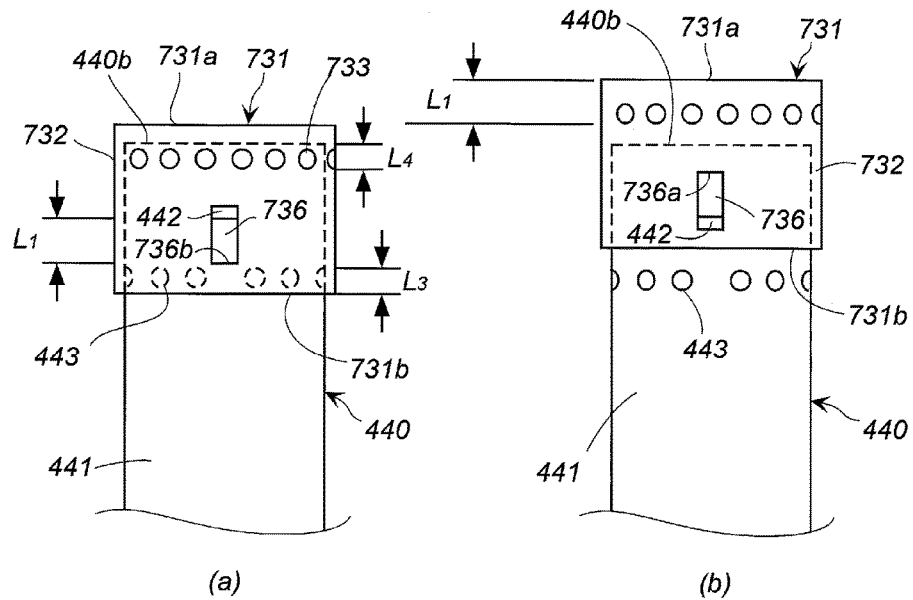
[Fig. 11]
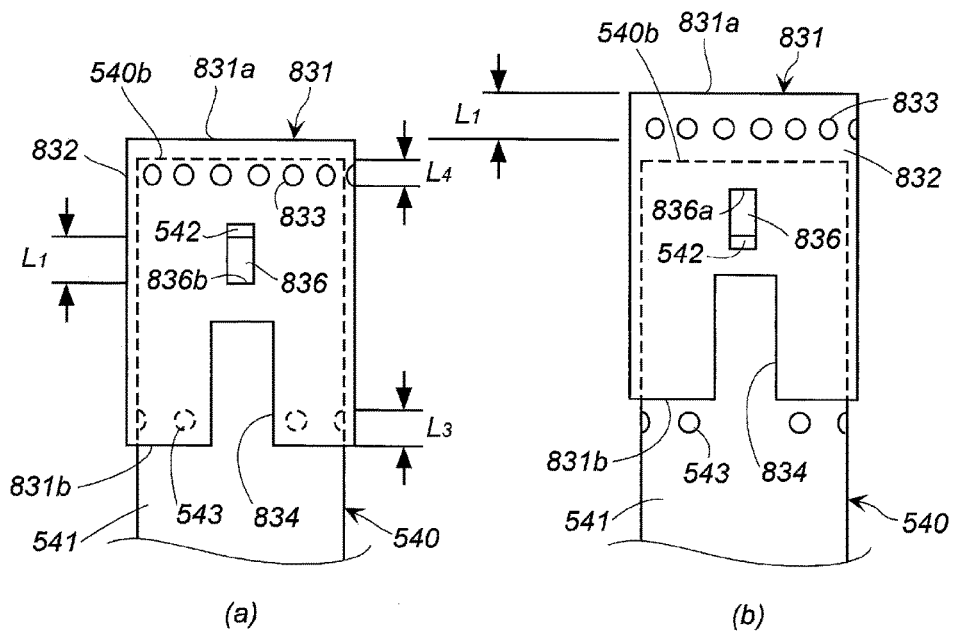

[Fig. 12]
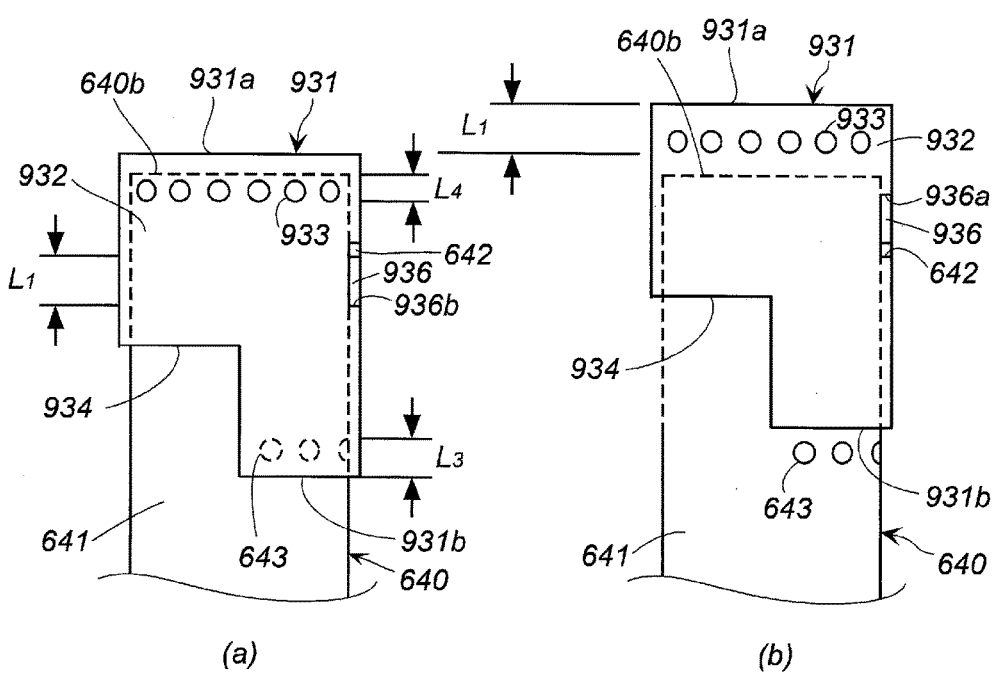
(a)  (b)

US 9,994,190 B2

GAS GENERATOR

FIELD OF INVENTION

The present invention relates to a gas generator for use in an airbag apparatus to be installed in an automobile.

DESCRIPTION OF THE RELATED ART

As a pyrotechnical gas generator using a gas generating agent, one in which a partition wall is arranged in a housing to separate a combustion chamber filled with the gas generating agent is used.

A through hole for communication between the interior surrounded by the partition wall and the exterior thereof is formed in the partition wall.

As the partition wall, a cylindrical member or a combination of a cylindrical member and a lid member is used.

U.S. Pat. No. 7,374,204 relates to an invention of an inflator for an airbag apparatus, and an inflator having two combustion chambers is disclosed.

FIG. 3 depicts the state before the actuation, FIG. 4 depicts the state in which only a first initiator 50 is actuated, and FIG. 5 depicts the state in which both the first initiator 50 and a second initiator 58 are actuated.

A second chamber 112 is formed by a combination of a combustion cup 110 and a cap 120 disposed inside a housing 70.

The cap 120 has perforations 124 which are closed by the circumferential wall surface of the combustion cup 110 before the actuation (FIG. 3).

At the time of actuation of both the first initiator 50 and the second initiator 58 (FIG. 5), the cap 120 is moved towards an upper wall 72 by the increase in pressure inside the second chamber 112, and thereby the perforations 124 closed by the circumferential wall surface of the combustion cup 110 are opened.

SUMMARY OF THE INVENTION

The Invention 1 of the present invention provides a gas generator including:

two combustion chambers in a housing provided with a gas discharge port, the two combustion chambers being separated into an inner combustion chamber which is inside a combustion chamber cup disposed in the housing, and an outer combustion chamber which is outside the combustion chamber cup, the combustion chamber cup including a combination of a cup member and a cylindrical member, the cup member having, in a circumferential wall surface thereof, a dropout-preventing slit formed in an axial direction from a first end on the side of a bottom surface to a second end on the side of an opening, the cylindrical member having a first end opening fixed to a bottom plate of the housing and a protrusion protruding radially outward in a circumferential wall surface thereof, the circumferential wall surface of the cup member having a plurality of through holes formed in a circumferential direction, and the cup member covering a second end opening of the cylindrical member, and the bottom surface of the cup member being positioned on the side of a top plate of the housing;

the plurality of through holes of the cup member being closed due to the circumferential wall surface of the cup member being radially opposite to and in contact with the circumferential wall surface of the cylindrical member when the protrusion of the cylindrical member is fitted at the first end of the dropout-preventing slit, at the time of actuation, the plurality of through holes of the cup member being opened when the cup member moves in an axial direction and stops with the protrusion abutting against the second end, shifted from the first end of the dropout-prevention slit.

Further, the Invention 2 of the present invention provides a gas generator including:

two combustion chambers in a housing provided with a gas discharge port, the two combustion chambers being separated into an inner combustion chamber which is inside a combustion chamber cup disposed in the housing, and an outer combustion chamber which is outside the combustion chamber cup, the combustion chamber cup including a combination of a cup member and a cylindrical member, the cup member having, in a circumferential wall surface thereof, a dropout-preventing slit formed in an axial direction from a first end on the side of a bottom surface to a second end on the side of an opening, the cylindrical member having a first end opening fixed to a bottom plate of the housing and a protrusion protruding radially outward in a circumferential wall surface thereof, the circumferential wall surface of the cylindrical member having a plurality of through holes formed in a circumferential direction, and the cup member covering a second end opening of the cylindrical member, and the bottom surface of the cup member being positioned on the side of a top plate of the housing;

the plurality of through holes of the cylindrical member being closed due to the circumferential wall surface of the cup member being radially opposite to and in contact with the circumferential wall surface of the cylindrical member when the protrusion of the cylindrical member is fitted at the first end of the dropout-preventing slit, at the time of actuation, the plurality of through holes of the cylindrical member being opened when the cup member moves in an axial direction and stops with the protrusion abutting against the second end, shifted from the first end of the dropout-prevention slit.

Further, the Invention 3 of the present invention provides a gas generator including:

two combustion chambers in a housing provided with a gas discharge port, the two combustion chambers being separated into an inner combustion chamber which is inside a combustion chamber cup disposed in the housing, and an outer combustion chamber which is outside the combustion chamber cup, the combustion chamber cup including a combination of a cup member and a cylindrical member, the cup member having, in a circumferential wall surface thereof, a dropout-preventing slit formed in an axial direction from a first end on the side of a bottom surface to a second end on the side of an opening, the cylindrical member having a first end opening fixed to a bottom plate of the housing and a protrusion protruding radially outward in a circumferential wall surface thereof, both the circumferential wall surface of the cup member and the circumferential wall surface of the cylindrical member having a plurality of through holes formed in a circumferential direction, and the cup member covering a second end opening of the cylindrical member, and the bottom surface of the cup member being positioned on the side of a top plate of the housing;

both the plurality of the through holes of the cup member and the plurality of the through holes of the cylindrical member being closed due to the circumferential wall surface of the cup member being radially opposite to and in contact with the circumferential wall surface of the cylindrical member when the protrusion of the cylindrical member is fitted at the first end of the dropout-preventing slit, at the time of actuation, both the plurality of through holes of the cup member and the plurality of the through holes of the cylindrical member being opened when the cup member moves in an axial direction and stops with the protrusion abutting against the second end, shifted from the first end of the dropout-prevention slit.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a sectional view, in the axis X direction, of the gas generator of the present invention;

FIG. 2 shows, in (a), a perspective view of the cup member of a combustion chamber cup, and in (b), a perspective view of the cup member of a combustion chamber cup of another embodiment;

FIG. 3 shows, in (a), a perspective view of the cylindrical member of a combustion chamber cup, in (b), a perspective view of the cylindrical member of a combustion chamber cup of another embodiment, and in (c), a perspective view of the cylindrical member of a combustion chamber cup of still another embodiment;

FIG. 4 shows a perspective view of a combustion chamber cup in which a cup member having through holes is combined with a cylindrical member having no through holes, in (a), the perspective view before the actuation, and in (b), the perspective view after the actuation;

FIG. 5 shows a front view of (a) and (b) in FIG. 4;

FIG. 6 shows a sectional view, in the axis X direction, of the gas generator of another embodiment of the present invention;

FIG. 7 shows a front view of a combustion chamber cup in which a cup member having no through holes is combined with a cylindrical member having through holes, in (a), the front view before the actuation, and in (b), the front view after the actuation;

FIG. 8 shows a front view of an embodiment other than that depicted in FIG. 7, in (a), the front view before the actuation, and in (b), the front view after the actuation;

FIG. 9 shows a front view of a combustion chamber cup in which a cup member having through holes is combined with a cylindrical member having through holes, in (a), the front view before the actuation, and in (b), the front view after the actuation;

FIG. 10 shows a front view of an embodiment other than that depicted in FIG. 9, in (a), the front view before the actuation, and, in (b), the front view after the actuation;

FIG. 11 shows a front view of still another embodiment other than that depicted in FIG. 9, in (a), the front view before the actuation, and, in (b), the front view after the actuation; and FIG. 12 shows a front view of still another embodiment other than that depicted in FIG. 9, in (a), the front view before the actuation, and, in (b), the front view after the actuation.

DETAILED DESCRIPTION OF INVENTION

In the embodiment illustrated by FIG. 3 to FIG. 5 in U.S. Pat. No. 7,374,204, the perforations 124 are formed close to the bottom surface of the cap 120, and the length (referred to as "length L" for the purpose of explanation) from the perforations 124 to the opening of the cap 120 is large.

When the inflator is actuated, an upper wall 72 and a lower wall 74 of the housing 70 are deformed in the axial direction due to the increase in internal pressure, and depending on the degree of deformation, the cap 120 can drop out from the combustion cup 110 when the length L is small.

When the cap 120 drops out from the combustion cup 110, the opening surface area exceeds that defined by the perforations 124 and the pressure inside the second chamber 112 changes (drops). As a result, the combustion state of a gas generant 61 filled therein changes, and therefore stable output performance cannot be obtained.

Thus, in the embodiment illustrated by FIG. 3 to FIG. 5, there is still room for improvement in terms of reliability of operation, and if the length L is increased to a degree sufficient to prevent the dropout, there is room for improvement from the standpoint of weight reduction.

The present invention provides a gas generator which makes it possible to maintain the reliability of operation and also to reduce weight.

The gas generator of the present invention has two combustion chambers, and the two combustion chambers are separated by a combustion chamber cup disposed inside the housing.

The combustion chamber cup has one of two end openings of a cylinder closed and includes a combination of a cylindrical member and a cup member.

The combination of the cylindrical member and the cup member in the present invention corresponds to the combination of the combustion cup 110 and the cap 120 in the invention disclosed in U.S. Pat. No. 7,374,204 (FIG. 3 to FIG. 5).

However, the combination of the cylindrical member and the cup member in the present invention is clearly different from that of the invention disclosed in U.S. Pat. No. 7,374,204 by the presence of a combination of a protrusion provided in the cylindrical member and a dropout-preventing slit provided in the cup member.

The cylindrical member has the protrusion which protrudes radially outward in the circumferential wall surface. The protrusion may be obtained by deforming part of the cylindrical member or fixing a separate member thereon.

The dropout-preventing slit formed in the circumferential wall surface of the cup member has a width and a shape such that the protrusion is fitted therein.

The dropout-preventing slit may be an open slit formed continuously from an opening or may be a closed slit which is not connected to the opening, provided that a surface to be abutted against the protrusion is formed.

The circumferential wall surface of the cup member of the Invention 1 of the present invention has a plurality of through holes formed in the circumferential direction. The through holes are combustion gas outlets from the combustion chamber inside the combustion chamber cup and serve as holes for communication with the combustion chamber outside the combustion chamber cup.

Before the actuation (corresponds to FIG. 3 in U.S. Pat. No. 7,374,204), the protrusion of the cylindrical member is positioned at the first end of the dropout-preventing slit.

In this state, since the circumferential wall surface of the cylindrical member and the circumferential wall surface of the cup member are radially opposite to and in contact with each other, the through holes of the cup member are closed from the inside.

At the time of actuation, the cup member moves, due to the increase in internal pressure, such that the protrusion located at the first end of the dropout-preventing slit moves to the second end, and the movement of the cup member is stopped by the second end abutting against the protrusion.

At this time, the through holes of the cup member appear above the second end opening of the cylindrical member and are opened, but in this state, the circumferential wall surface of the cup member on the side of the opening and the circumferential wall surface of the cylindrical member on the side of the second end opening are in contact with each other, and the protrusion is fitted in the dropout-preventing slit.

Therefore, even when the housing is deformed in the axial direction at the time of actuation, the cup member does not drop out and also the abovementioned "length L" in the invention (FIG. 3 to FIG. 5) of U.S. Pat. No. 7,374,204 is reduced. As a result, the weight is further reduced.

In the Invention 2 of the present invention, the combustion chamber cup includes a combination of a cup member and a cylindrical member in the same manner as in the Invention 1. However, it is different in that the circumferential wall surface of the cylindrical member has a plurality of through holes formed in the circumferential direction while the circumferential wall surface of the cup member does not have a plurality of through holes formed in the circumferential direction.

The through holes are combustion gas outlets from the combustion chamber inside the combustion chamber cup and serve as holes for communication with the combustion chamber outside the combustion chamber cup.

Before the actuation, the protrusion of the cylindrical member is positioned at the first end of the dropout-preventing slit of the cup member.

In this state, since the circumferential wall surface of the cylindrical member and the circumferential wall surface of the cup member are radially opposite to and in contact with each other, the through holes of the cylindrical member are closed from the outside.

At the time of actuation, the cup member moves, due to the increase in internal pressure, such that the protrusion located at the first end of the dropout-preventing slit moves to the second end, and the movement of the cup member is stopped by the second end abutting against the protrusion.

At this time, the through holes of the cylindrical member appear below the opening of the cup member and are opened, but in this state, the circumferential wall surface of the cup member on the side of the opening and the circumferential wall surface of the cylindrical member on the side of the second end opening are in contact with each other, and the protrusion is fitted in the dropout-preventing slit.

Therefore, even when the housing is deformed in the axial direction at the time of actuation, the cup member does not drop out.

In the Invention 3 of the present invention, the combustion chamber cup includes a combination of a cup member and a cylindrical member in the same manner as in each of the Inventions 1 and 2. However, it is different in that both the circumferential wall surface of the cup member and the circumferential wall surface of the cylindrical member have a plurality of through holes formed in the circumferential direction.

The through holes are combustion gas outlets from the combustion chamber inside the combustion chamber cup and serve as holes for communication with the combustion chamber outside the combustion chamber cup.

Before the actuation, the protrusion of the cylindrical member is positioned at the first end of the dropout-preventing slit of the cup member.

In this state, since the circumferential wall surface of the cylindrical member and the circumferential wall surface of the cup member are radially opposite to and in contact with each other, the through holes of the cup member are closed from the inside and the through holes of the cylindrical member are closed from the outside.

At the time of actuation, the cup member moves, due to the increase in internal pressure, such that the protrusion located at the first end of the dropout-preventing slit moves to the second end, and the movement of the cup member is stopped by the second end abutting against the protrusion.

At this time, the through holes of the cup member appear above the second end opening of the cylindrical member and are opened. And the through holes of the cylindrical member appear below the opening of the cup member and are opened. Since the combustion gas is thus ejected from positions at different heights in the axial direction, the concentration of gas ejection into the outer combustion chamber is avoided.

The circumferential wall surface of the cup member on the side of the opening and the circumferential wall surface of the cylindrical member on the side of the second end opening are in contact with each other, and the protrusion is fitted in the dropout-preventing slit.

Therefore, even when the housing is deformed in the axial direction at the time of actuation, the cup member does not drop out.

In the gas generator of the present invention, it is possible that the protrusion which protrudes radially outward from the circumferential wall surface of the cylindrical member is obtained by cutting axially the circumferential wall surface of the second end opening in two circumferentially spaced locations and bending outwardly.

Since the protrusions are formed by cutting and folding part of the cylindrical member, the processing is easy and no increase in mass is caused by the formation of the protrusions.

In the gas generator of the present invention, it is possible that the protrusion, which protrudes radially outward from the circumferential wall surface of the cylindrical member, is obtained by cutting axially the circumferential wall surface of the second end opening, further cutting in the circumferential direction, and bending outwardly.

Since the protrusion is formed by cutting and folding part of the cylindrical member, the processing is easy and no increase in mass is caused by the formation of the protrusion.

Further, the resistance to a force from the axial direction (on the side of the first end opening) is increased.

In the gas generator of the present invention, it is possible that the protrusion, which protrudes radially outward from the circumferential wall surface of the cylindrical member, is a separate member fixed to the circumferential wall surface.

Where such separate member is used as the protrusion, the protrusion is formed at a desired location at the circumferential wall surface. Therefore, a positional relationship with the dropout-preventing slit is easily adjusted.

In the gas generator of the present invention, it is possible that the cup member has, in addition to the dropout-preventing slit formed in the axial direction from the first end on the side of the bottom surface to the second end on the side of the opening, a connection slit formed in the circumferential direction from the second end of the dropout-preventing slit, and an introducing slit formed from the connection slit to the opening of the cup member.

Since the introducing slit is formed to the opening, as mentioned hereinabove, the dropout-preventing slit is an open slit which is linked to the outside of the cup member through the connection slit and the introducing slit.

Therefore, when the protrusion is fitted in the dropout-preventing slit, the protrusion is passed from the opening of the cup member through the introducing slit and the connection slit, and then fitted in the dropout-preventing slit.

The width of the introducing slit and the connection slit is preferably larger than the width of the protrusion to facilitate the introduction and movement of the protrusion.

In the gas generator of the present invention, it is possible that the dropout-preventing slit of the cup member is formed in the axial direction from the first end on the side of the bottom surface to the second end on the side of the opening in the circumferential wall surface, and the second end does not reach the opening of the cup member, the circumferential wall surface of the cup member has a cut-out portion which is obtained by cutting out a part of the circumferential wall surface where the dropout-preventing slit and the through holes are not present, and the cut-out portion is a combination of a first cut-out portion obtained by cutting out the part of the circumferential wall surface including the opening of the cup member and a second cut-out portion obtained by cutting out the part of the circumferential wall surface which is radially opposite to the first cut-out portion.

In the gas generator of the present invention, the cup member has through holes.

The dropout-preventing slit is a closed slit which is not connected to the opening of the cup member.

Therefore, when the protrusion in the cylindrical member is fitted in the dropout-preventing slit such that the opening of the cup member is pushed and spread outward, the fitting operation is facilitated.

In order to facilitate such fitting operation, the cup member can be made of a flexible metal such as stainless steel or aluminum, and also the abovementioned cut-out portions can be formed.

Shapes of the first cut-out portion and the second cut-out portion are not particularly limited, but it is preferred that the circumferential wall surface including the opening is cut out into a square, rectangular, trapezoidal, or partially circular (for example, semicircular) shape.

As mentioned hereinabove, where cut-out portions are formed in two radially opposite locations in the circumferential wall surface of the cup member, since the opening of the cup member is easily pushed and spread radially outward, fitting on the protrusion of the cylindrical member is facilitated.

In the gas generator of the present invention, it is possible that at least the circumferential wall surface of the cylindrical member has the plurality of the through holes formed in the circumferential direction, the circumferential wall surface of the cup member has a cut-out portion in one or not less than two locations, the cut-out portion being obtained by cutting out a part of the circumferential wall surface of the cup member which is not opposite, in the thickness direction, to the plurality of the through holes of the cylindrical member, and the cut-out portion is obtained by cutting out part of the circumferential wall surface including the opening of the cup member.

In the gas generator of the present invention, at least the cylindrical member has through holes, and the cup member may have the through holes or may not have the through holes.

The entire combustion chamber cup including the cup member is reduced in weight by forming a cut-out portion in the cup member, the cut-out portion being obtained by cutting out a part of the circumferential wall surface which is not opposite, in the thickness direction, to the through holes of the cylindrical member.

The shape of the cut-out portion is not particularly limited, but it is preferred that the circumferential wall surface including the opening is cut out into a square, rectangular, trapezoidal, or partially circular (for example, semicircular) shape.

In the case of the embodiment such as illustrated by FIGS. 7A and 7B in U.S. Pat. No. 7,374,204, where a rectangularly cut portion is present in the circumferential wall surface of a combustion chamber cap 120*b*, when the cap 120*b* rotates and the cut-out portion overlaps the perforations 124*b*, the perforations 124*b* are opened before the actuation.

On the other hand, in the gas generator of the present invention, since the protrusion of the cylindrical member is fitted in the dropout-preventing slit of the cup member, the cup member and the cylindrical member are prevented from rotating with respect to each other in the circumferential direction.

Therefore, even when the cylindrical member has the through holes and the cup member has the cut-out portion, the through holes of the cylindrical member are prevented from being opened before the actuation.

The gas generator of the present invention uses a combination of the cup member and the cylindrical member as the combustion chamber cup for separating the two combustion chambers, which has a movement-limiting means for limiting an axial movement of the cup member at the time of actuation.

Therefore, the reliability of operation is increased. In addition, by using the movement-limiting means, it is possible to reduce weight.

Embodiments of the Invention

<Gas Generator Depicted in FIG. 1>

A gas generator 10 depicted in FIG. 1 is the same, except for some members, as that depicted in FIG. 1 of JP-A No. 2011-207326.

In FIG. 1 of JP-A No. 2011-207326, a combination of a second combustion chamber cup 41 and a cup-shaped cover member 50 is arranged, whereas, in FIG. 1 of the present invention, a second combustion chamber cup 130 including a cup member 131 and a cylindrical member 140 is arranged instead of the aforementioned combination.

The exterior of the second combustion chamber cup 130 including the cup member 131 and the cylindrical member 140 is a first combustion chamber (an outer combustion chamber) 31, and the interior of the second combustion chamber cup 130 is a second combustion chamber (an inner combustion chamber) 46.

A retainer 60 depicted in FIG. 1 of JP-A No. 2011-207326 is not used.

A diffuser shell 12 and a closure shell 13 are welded at a joining portion 15 to form a housing 11 serving as an outer container.

A plurality of gas discharge ports 14 are provided in a circumferential surface of the diffuser shell 12. The gas discharge ports 14 are closed from the inside with a seal tape 16 of aluminum or the like.

Two holes are provided in the bottom plate of the closure shell 13. Each of the two holes is formed to be eccentric, being positioned radially outward with respect to a central axis X of the housing 11.

A first igniter 21 which is fixed to a first igniter collar 22 is attached to one hole, and a second igniter 25 fixed to a second igniter collar 26 is attached to the other hole.

A cylindrical filter 18 is disposed inside the housing 11. A cylindrical gap 17 is provided between the outer circumferential surface of the filter 18 and, the gas discharge ports 14 and the seal tape 16.

The first combustion chamber 31 is formed on the inside of the filter 18 and filled with a first gas generating agent 33.

Further, an ignition chamber cup 32 and a second combustion chamber cup 130 are disposed adjacently and spaced radially inside the first combustion chamber 31.

The ignition chamber cup 32 has an opening 32a, a top plate 32b, and a circumferential wall portion 32c, and is fitted onto the first igniter collar 22 from the opening 32a to cover the first igniter 21. The ignition chamber cup 32 is disposed such that a central axis $X_1$ thereof is eccentrically and radially outward with respect to the central axis X of the housing 11.

The circumferential wall portion 32c of the ignition chamber cup 32 has a constant outer diameter from the top plate 32b to the opening 32a. A plurality of first communication holes 34 are formed in the circumferential wall portion 32c. The plurality of the first communication holes 34 are closed with a seal member (not depicted in the drawing) before the gas generator 10 is actuated. After the gas generator 10 is actuated, these holes are opened to cause the first combustion chamber 31 to communicate with the ignition chamber 30.

The interior of the ignition chamber cup 32 is the ignition chamber 30, and a space in the ignition chamber 30, other than the first igniter 21, is filled with a known enhancer or gas generating agent as a transfer charge 35.

The second combustion chamber cup 130 is formed of a combination of the cup member 131 and the cylindrical member 140.

The interior of the second combustion chamber cup 130 is the second combustion chamber 46 and is filled with a known second gas generating agent 43.

The cup member 131 covers a second end opening 140b of the cylindrical member 140, and a bottom surface 131a of the cup member 131 is positioned on the side of a housing top plate 12a.

The cylindrical member 140 is fixed by the first end opening 140a fitted onto a collar 26.

As for the cup member 131 and the cylindrical member 140, by adjusting the inner diameter of the cup member 131 and the outer diameter of the cylindrical member 140, the cup member 131 is fitted on the cylindrical member 140 without a gap.

The cup member 131 and the cylindrical member 140 depicted in FIG. 2 and FIG. 3 can be used. In FIG. 1, the cup member 131 depicted in (a) in FIG. 2 is used.

In FIG. 1, a gap is present between the bottom surface 131a of the cup member 131 and the top plate 12a of the housing. However, where the first gas generating agent 33 enters the gap, it can hinder the movement of the cup member 131 in the axis X direction at the time of actuation. Therefore, a cushion material which is flexible enough not to hinder the movement of the cup member 131 may be disposed to exclude the first gas generating agent 33.

The second combustion chamber cup 130 is disposed such that a central axis $X_2$ thereof is eccentrically and radially outward with respect to the central axis X of the housing 11.

The cup member 131 depicted in (a) in FIG. 2 has a bottom surface 131a, a circumferential wall surface 132, and an opening 131b.

A plurality of through holes 133 are formed equidistantly in the circumferential direction in the circumferential wall surface 132 on the side of the bottom surface 131a.

A dropout-preventing slit 136, a connection slit 137, and an introducing slit 138 are formed continuously in a portion of the circumferential wall surface 132 where the through holes 133 are not formed.

The dropout-preventing slit 136 is formed in the axial direction from a first end 136a on the side of the bottom surface 131a to a second end 136b on the side of the opening 131b.

The connection slit 137 is formed in the circumferential direction from the second end 136b of the dropout-preventing slit 136.

The introducing slit 138 is formed from the connection slit 137 to the opening 131b.

Further, the dropout-preventing slit 136, the connection slit 137, and the introducing slit 138 can be formed at two radially opposite locations in the circumferential wall surface 132.

A cup member 231 depicted in (b) in FIG. 2 has a bottom surface 231a, a circumferential wall surface 232, and an opening 231b.

A plurality of through holes 233 are formed equidistantly in the circumferential direction in the circumferential wall surface 232 on the side of the bottom surface 231a.

A dropout-preventing slit 236 is formed in a portion of the circumferential wall surface 232 where the through holes 233 are not formed.

The dropout-preventing slit 236 is formed in the axial direction from a first end 236a on the side of the bottom surface 231a to a second end 236b on the side of the opening 231b. The dropout-preventing slit 236 can be formed at two radially opposite locations in the circumferential wall surface 232.

The circumferential wall surface 232 has a cut-out portion 234 obtained by cutting out a part of the circumferential wall surface where the dropout-preventing slit 236 and the through holes 233 are not present. The cut-out portion 234 is also formed in the circumferential wall surface 232 on the radially opposite side.

The two cut-out portions 234 are formed to facilitate radially outward spreading of the opening 231b of the cup member 231 and also to reduce weight.

The cut-out portions 234 may have any shape that demonstrates the aforementioned function, for example, a square, rectangular, trapezoidal, or partially circular (semicircular, etc.) shape.

The cylindrical member 140 depicted in (a) in FIG. 3 has a first end opening 140a, a circumferential wall surface 141, and a second end opening 140b.

Two protrusions 142 protruding radially outward are formed on radially opposite portions in the circumferential wall surface 141.

The protrusions 142 are obtained by cutting axially the circumferential wall surface 141 of the second end opening 140b in two circumferentially spaced locations and folding it outward.

The cylindrical member 240 depicted in (b) in FIG. 3 has a first end opening 240a, a circumferential wall surface 241, and a second end opening 240b.

A protrusion 242 protruding radially outward is formed in the circumferential wall surface 241.

The protrusion 242 is obtained by cutting axially the circumferential wall surface 241 of the second end opening 240b, then cutting it in the circumferential direction, and folding it outward.

The cylindrical member 340 depicted in (c) in FIG. 3 has a first end opening 340a, a circumferential wall surface 341, and a second end opening 340b.

A protrusion (a columnar protrusion) 342 protruding radially outward is formed on the circumferential wall surface 341.

The protrusion 342 is obtained by fixing a protrusion of a separate member to the circumferential wall surface 341, by means of a welding or the like.

Combinations of the cup members depicted in (a) and (b) in FIG. 2 and the cylindrical members depicted in (a) to (c) in FIG. 3 will be explained hereinbelow.

When the cup member 131 depicted in (a) in FIG. 2 covers the cylindrical member 140 depicted in (a) in FIG. 3, the protrusions 142 are introduced from the introducing slits 138, allowed to pass through the connection slits 137 and fitted at positions of the first ends 136a of the dropout-preventing slits 136.

As for the width of the protrusion 142 and the width of the introducing slit 138, the width of the introducing slit 138 is made slightly larger to facilitate the passage of the protrusion.

As for the thickness of the protrusion 142 and the width of the connection slit 137, the width of the connection slit 137 is made slightly larger to facilitate the passage of the protrusion.

As for the width of the protrusion 142 and the width of the dropout-preventing slit 136, the width of the dropout-preventing slit 136 is made slightly larger to facilitate the passage of the protrusion.

When the cup member 131 depicted in (a) in FIG. 2 covers the cylindrical member 240 depicted in (b) in FIG. 3, the protrusion 242 is introduced from the introducing slit 138, allowed to pass through the connection slit 137, and fitted at the position of the first end 136a of the dropout-preventing slit 136.

As for the thickness of the protrusion 242 and the width of the introducing slit 138, the width of the introducing slit 138 is made slightly larger to facilitate the passage of the protrusion.

As for the width of the protrusion 242 and the width of the connection slit 137, the width of the connection slit 137 is made slightly larger to facilitate the passage of the protrusion.

As for the thickness of the protrusion 242 and the width of the dropout-preventing slit 136, the width of the dropout-preventing slit 136 is made slightly larger to facilitate the passage of the protrusion.

When the cup member 131 depicted in (a) in FIG. 2 covers the cylindrical member 340 depicted in (c) in FIG. 3, the protrusion 342 is introduced from the introducing slit 138, allowed to pass through the connection slit 137, and fitted at the position of the first end 136a of the dropout-preventing slit 136.

As for the outer diameter of the protrusion 342 and the width of the introducing slit 138, the width of the introducing slit 138 is made slightly larger to facilitate the passage of the protrusion.

As for the outer diameter of the protrusion 342 and the width of the connection slit 137, the width of the connection slit 137 is made slightly larger to facilitate the passage of the protrusion.

As for the outer diameter of the protrusion 342 and the width of the dropout-preventing slit 136, the width of the dropout-preventing slit 136 is made slightly larger to facilitate the passage of the protrusion.

When the cup member 231 depicted in (b) in FIG. 2 covers the cylindrical member 140 depicted in (a) in FIG. 3, the protrusion 142 is fitted at the first end 236a of the dropout-preventing slit 236 while spreading radially outward the opening 231b of the cup member 231.

As for the width of the protrusion 142 and the width of the dropout-preventing slit 236, the width of the dropout-preventing slit 236 is made slightly larger such that the protrusion is easily fitted therein.

When the cup member 231 depicted in (b) in FIG. 2 covers the cylindrical member 240 depicted in (b) in FIG. 3, the protrusion 242 is fitted at the first end 236a of the dropout-preventing slit 236 while spreading radially outward the opening 231b of the cup member 231.

As for the thickness of the protrusion 242 and the width of the dropout-preventing slit 236, the width of the dropout-preventing slit 236 is made slightly larger such that the protrusion is easily fitted therein.

When the cup member 231 depicted in (b) in FIG. 2 covers the cylindrical member 340 depicted in (c) in FIG. 3, the protrusion 342 is fitted at the first end 236a of the dropout-preventing slit 236 while spreading radially outward the opening 231b of the cup member 231.

As for the outer diameter of the protrusion 342 and the width of the dropout-preventing slit 236, the width of the dropout-preventing slit 236 is made slightly larger such that the protrusion is easily fitted therein.

When through holes are formed in the cup member, it is preferred that the through holes are formed in a range equal to or less than half of the length from the bottom surface to the opening (a range near the side of the bottom surface) in order to open the through holes reliably.

The operation of the gas generator 10 depicted in FIG. 1 will be explained hereinbelow with reference to FIG. 1, FIG. 4, and FIG. 5. Activations of the first igniter 21 and the second igniter 25 include the following cases according to the degree of impact at the time of collision: only the first igniter 21 is actuated; the first igniter 21 is initially actuated and the second igniter 25 is actuated with a delay; and the first igniter 21 and the second igniter 25 are actuated at the same time. Explained hereinbelow is the case in which the first igniter 21 is initially actuated and the second igniter 25 is actuated with a delay.

When the automobile collides and receives the impact, an actuation signal is received from a control unit, the first igniter 21 is actuated and ignited, and the transfer charge 35 inside the ignition chamber 30 is ignited and burned.

Then, a combustion product (a high-temperature gas, flame, etc.) enters the first combustion chamber 31 through the first communication hole 34 and ignites and burns the first gas generating agent 33, thereby generating combustion gas.

At this time, the through holes (the second communication holes) 133 formed in the cup member 131 of the second combustion chamber cup 130 are closed from the inside by the circumferential wall surface 141 of the cylindrical member 140, and the second gas generating agent 43 in the second combustion chamber 46 is not ignited or burned by the combustion gas.

The combustion gas generated from the first gas generating agent 33 in the first combustion chamber 31 is filtered and cooled while passing through the filter 18 and then ruptures the seal tape 16 and is discharged from the gas discharge ports 14.

The second igniter 25 is actuated and ignited with a delay after the actuation of the first igniter 21, the second gas generating agent 43 in the second combustion chamber 46 is ignited and burned, and combustion gas is generated.

Where the pressure inside the second combustion chamber cup 130 (the second combustion chamber 46) increases, the cup member 131 slides upward (in the axis $X_2$ direction in FIG. 1). At this time, the dropout-preventing slit 136 also moves upward, but the upward sliding of the cup member 131 is stopped when the second end 136b abuts against the protrusion 142. As a result, the cup member 131 is not separated from the cylindrical member 140 even when the housing 11 is deformed in the axis X direction due to the increase in pressure caused by the combustion gas generated from the first gas generating agent 33.

In this operation process, the cup member 131 moves by a length L1 (corresponds to a length obtained by subtracting the thickness of the protrusion 142 from the axial length of the dropout-preventing slit 136), and by making the length L1 larger than L2 (a length from the second end opening 140b of the cylindrical member to the lower end of the through hole 133 in a state in which the protrusion 142 is positioned at the first end 136a before the actuation) (L1>L2), the through holes 133 appear above the second end opening 140b and are opened.

Therefore, even when a length L from the lower end of the through hole 133 to the opening 131b of the cup member 131 (that is, a length corresponding to the length L from the through hole 124 to the opening of the cap 120 in FIG. 3 to FIG. 5 of U.S. Pat. No. 7,374,204) is shortened to reduce weight, the through holes 133 are reliably opened and the cup member 131 is prevented from dropping out from the cylindrical member 140 by the combination of the dropout-preventing slit 136 and the protrusion 142.

In particular, in the gas generator depicted in FIG. 1, the diffuser shell 12 and the closure shell 13 are connected only by the joining portion 15, the top plate 12a and the bottom plate of the closure shell are easily deformed by the pressure generated in the first combustion chamber, and the gap between the bottom surface 131a of the cup member 131 and the top plate 12a is increased. The cup member 131 is prevented from dropping out from the cylindrical member 140 by the structure of the present invention.

If the cup member 131 drops out, an opening area becomes more than the total opening area of the through holes 133 and combustion performance of the second gas generating agent 43 becomes unstable. However, in the gas generator of the present invention, since the cup member 131 does not drop out from the cylindrical member 140 at the time of actuation, the second gas generating agent 43 burns stably.

Where the through holes 133 of the second combustion chamber cup 130 are opened, the high-temperature combustion gas is ejected therefrom into the first combustion chamber 31, filtered and cooled when passing through the filter 18, and discharged from the gas discharge ports 14.

The combustion gas, which is generated in the first combustion chamber 31 and the second combustion chamber 46, is discharged from the gas discharge ports 14 into an airbag (not depicted in the drawings) and inflates the airbag.

<Gas Generator Depicted in FIG. 6>

FIG. 6 is an axial sectional view illustrating another embodiment of the gas generator 100 of the present invention.

The gas generator 100 has a housing 111 in which a diffuser shell 112 and a closure shell 113 are laser-welded in a joining portion 114. The housing 111 is formed of a metal such as iron or stainless steel.

A known cylindrical filter 120 is disposed inside the housing 111.

The diffuser shell 112 has a top plate 112a and a circumferential wall portion 112b, and the closure shell 113 has a bottom plate 113a and a circumferential wall portion 113b.

A predetermined number of gas discharge ports 117 are provided in the diffuser shell 112 and closed from the inside with an aluminum seal tape 118 to prevent moisture penetration. A retainer 134 is fitted on the side of the top plate 112a of the diffuser shell.

A central hole is formed in the central portion of the bottom plate 113a of the closure shell 113. A metal collar 149 is fitted and fixed by welding in the central hole.

An igniter 148 is attached to the collar 149, and the collar 149 is fixed to the bottom plate 113a.

A retainer 152 is fitted on the side of the bottom plate 113a of the closure shell. The retainer 152 adjusts a volume of a second combustion chamber 150 according to a filled amount of a second gas generating agent 151. FIG. 6 illustrates an example with a maximum volume. As an amount of the second gas generating agent 151 decreases, the retainer 152 is moved to the top plate 112a.

A combustion chamber cup 130 made of stainless steel is disposed inside the housing 111 such as to be concentric with the housing 111.

The interior of the combustion chamber cup 130 is a first combustion chamber (an inner combustion chamber) 145, and the inside of the filter 120 but the outside the combustion chamber cup 130 is the second combustion chamber (an outer combustion chamber) 150.

A predetermined amount of a first gas generating agent 146 is accommodated inside the first combustion chamber 145, and a predetermined amount of the second gas generating agent 151 is accommodated in the second combustion chamber 150.

Known gas generating agents (for example, those described in JP-A No. 2005-199867) can be used as the first gas generating agent 146 and the second gas generating agent 151, and the second gas generating agent 151 with a combustion temperature lower than that of the first gas generating agent 146 is used.

The combustion chamber cup 130 includes a combination of a cup member 131 and a cylindrical member 140.

The cup member 131 covers a second end opening 140b of the cylindrical member 140, and the bottom surface 131a of the cup member 131 is positioned on the side of the top plate 112a of the housing.

The first end opening 140a of the cylindrical member 140 is fitted onto the collar 149 and held by the collar 149 and the retainer 152 to be fixed therebetween. Incidentally, even when the retainer 152 is moved to the top plate 112a, the circumferential wall surface 141 of the cylindrical member 140 is still pressed radially inward, and thereby the cylindrical member 140 is fixed.

As for the cup member 131 and the cylindrical member 140, by adjusting the inner diameter of the cup member 131 and the outer diameter of the cylindrical member 140, it is possible to fit, without a gap, the cup member 131 onto the cylindrical member 140.

The cup member 131 and the cylindrical member 140 depicted in FIG. 2 and FIG. 3 can be used. In FIG. 6, the cup member 131 depicted in (a) in FIG. 2 is used.

In FIG. 6, a gap is present between the bottom surface 131a of the cup member 131 and the top plate 112a. However, where the second gas generating agent 151 enters the gap, it can hinder the movement of the cup member 131 in the axis X direction at the time of actuation. Therefore, a cushion material which is flexible enough not to hinder the movement of the cup member 131 may be disposed to exclude the second gas generating agent 151.

The operation of the gas generator 100 performed when the gas generator 100 is incorporated in an airbag apparatus of an automobile will be explained hereinbelow with reference to FIG. 6, FIG. 4, and FIG. 5.

Before the igniter 148 is actuated, the cup member 131 and the cylindrical member 140 forming the combustion chamber cup 130 are in a state depicted in (a) in FIG. 4 and in (a) in FIG. 5.

Since the through holes 133 of the cup member 131 are below the second end opening 140b of the cylindrical member 140, the through holes are closed from the inside by the circumferential wall surface 141.

The protrusions 142 of the cylindrical member 140 are fitted at the first end 136a of the dropout-preventing slit 136 of the cup member 131.

When the cup member 131 moves upward (in the axis X direction in FIG. 1) from the state before the actuation which is depicted in (a) in FIG. 4 and in (a) in FIG. 5 by at least the length L2 from the lower end of the through hole 133 to the second end opening 140b, the through holes 133 appear above the second end opening 140b and are opened.

When the automobile collides, a command is received from an impact sensor, the igniter 148 is actuated, and the first gas generating agent 146 in the combustion chamber cup 130 (the first combustion chamber 145) is ignited and burned and a combustion product is generated.

When the pressure inside the combustion chamber cup 130 (the first combustion chamber 145) increases, the cup member 131 slides upward (in the axis X direction in FIG. 6). At this time, the dropout-preventing slit 136 also moves upward, but the upward sliding of the cup member 131 is stopped when the second end 136b abuts against the protrusion 142, and thereby the cup member 131 is not separated from the cylindrical member 140.

In this operation process, the cup member 131 moves by a length L1 (corresponds to a length obtained by subtracting the thickness of the protrusion 142 from the length of the dropout-preventing slit 136), and by making the length L1 larger than the abovementioned length L2 (L1>L2), the through holes 133 appear above the second end opening 140b and are opened.

Therefore, even when a length L from the lower end of the through hole 133 to the opening 131b of the cup member 131 (that is, the length corresponding to the length L from the through hole 124 to the opening of the cap 120 in FIG. 3 to FIG. 5 of U.S. Pat. No. 7,374,204) is shortened to reduce weight, the through holes 133 are reliably opened and the cup member 131 is prevented from dropping out from the cylindrical member 140 by the combination of the dropout-preventing slit 136 and the protrusion 142.

If the cup member 131 drops out, an opening area becomes more than the total opening area of the through holes 133 and combustion performance of the first gas generating agent 146 becomes unstable. However, in the gas generator of the present invention, since the cup member 131 does not drop out from the cylindrical member 140 at the time of actuation, the first gas generating agent 146 burns stably.

Where the through holes 133 of the combustion chamber cup 130 are opened, a high-temperature combustion gas is ejected therefrom into the second combustion chamber 150, ignites and burns the second gas generating agent 151, and causes further generation of combustion gas.

The combustion gas generated in the first combustion chamber 145 and the second combustion chamber 150 is discharged from the gas discharge ports 117 into an airbag (not depicted in the drawing) and inflates the airbag.

In the gas generator 100 depicted in FIG. 6, the cup member and the cylindrical member may be any of the following combinations of those depicted in (a) in FIG. 2 and in (b) in FIG. 3, in (a) in FIG. 2 and in (c) in FIG. 3, in (b) in FIG. 2 and in (a) in FIG. 3, in (b) in FIG. 2 and in (b) in FIG. 3, and in (b) in FIG. 2 and in (c) in FIG. 3.

In the gas generator of the present invention, the combustion chamber cup of each of the below-described embodiments can be used instead of the combustion chamber cup including the cylindrical member and the cup member in the gas generator depicted in FIG. 1 or FIG. 6.

<Combustion Chamber Cup Depicted in FIG. 7>

A cup member 431 depicted in (a) in FIG. 7 has a bottom surface 431a, a circumferential wall surface 432, and an opening 431b.

A dropout-preventing slit 436 is formed in the circumferential wall surface 432.

The dropout-preventing slit 436 is formed in the axial direction from a first end 436a on the side of the bottom surface 431a to a second end 436b on the side of the opening 431b.

The dropout-preventing slit 436 can be formed at two radially opposite locations in the circumferential wall surface 432.

A cylindrical member 440 depicted in (a) in FIG. 7 is the same as the cylindrical member 340 depicted in (c) in FIG. 3, except for the shape of a protrusion and the presence of through holes 443.

The cylindrical member 440 has a circumferential wall surface 441 and a second end opening 440b and also has a first end opening at the other side of the second end opening 440b.

A plurality of the through holes 443 are formed equidistantly in the circumferential direction in the circumferential wall surface 441, and a protrusion 442 which protrudes radially outward is also formed therein.

The plurality of the through holes 443 are formed above half of the height of the cylindrical member 440 (on the side of the second end opening 440b). If the formation position of the through holes 443 is lower than that, it is difficult to reduce weight because the depth of the cup member 431 increases.

The protrusion 442 is present in the middle between the second end opening 440b and the through holes 443.

The cup member 431 covers the cylindrical member 440 as depicted in (a) in FIG. 7, and these members are used in this state in the gas generator depicted in FIG. 1 or FIG. 6.

In this case, the adjustment is made such that L1>L3.

The length L1 corresponds to a length obtained by subtracting the thickness of the protrusion 442 from the axial length of the dropout-preventing slit 436.

The length L3 is a length from the upper end of the through hole 443 to the opening 431*b* when the cup member 431 is attached to the cylindrical member 440 with the protrusion 442 positioned at the first end 436*a* before the actuation.

During the operation, the cup member 431 moves by the length L1, and by making the length L1 larger than L3 (L1>L3), the through holes 443 appear below the opening 431*b* and are opened ((b) in FIG. 7).

<Combustion Chamber Cup Depicted in FIG. 8>

The cup member 531 depicted in (a) in FIG. 8 has a bottom surface 531*a*, a circumferential wall surface 532, and an opening 531*b*.

A dropout-preventing slit 536 is formed in the circumferential wall surface 532.

The dropout-preventing slit 536 is formed in the axial direction from a first end 536*a* on the side of the bottom surface 531*a* to a second end 536*b* on the side of the opening 531*b*.

The dropout-preventing slit 536 can be formed at two radially opposite locations in the circumferential wall surface 532.

The circumferential wall surface 532 has a cut-out portion 534 obtained by cutting out a part of the circumferential wall surface where the dropout-preventing slit 536 is not present. The cut-out portion 534 is also formed in the circumferential wall surface 532 on the radially opposite side.

The two cut-out portions 534 are formed to facilitate radially outward spreading of the opening 531*b* of the cup member 531 and also to reduce weight.

The cut-out portions 534 may have any shape that demonstrates the aforementioned function, for example, a square, rectangular, trapezoidal, or partially circular (semicircular, etc.) shape.

In (a) in FIG. 8, the dropout-preventing slit 536 and the cut-out portions 534 are formed coaxially, but they may not be formed coaxially.

A cylindrical member 540 depicted in (a) in FIG. 8 is the same as the cylindrical member 340 depicted in (c) in FIG. 3, except for the shape of a protrusion and the presence of through holes 543.

The cylindrical member 540 has a circumferential wall surface 541 and a second end opening 540*b* and also has a first end opening at the other side of the second end opening 540*b*.

A plurality of the through holes 543 are formed equidistantly in the circumferential direction in the circumferential wall surface 541, but the through holes are not formed in part of the circumferential wall surface 541 that faces the cut-out portions 534 when the cylindrical member is combined with the cup member 531.

A protrusion 542 which protrudes radially outward is formed in the circumferential wall surface 541.

The plurality of the through holes 543 are formed at about half of the height of the cylindrical member 540.

The protrusion 542 is present on the side of the second end opening 540*b* with respect to the middle between the second end opening 540*b* and the through holes 543.

The cup member 531 covers the cylindrical member 540 as depicted in (a) in FIG. 8, and these members are used in this state in the gas generator depicted in FIG. 1 or FIG. 6.

The cut-out portions 534 of the cup member 531 are positioned in portions of the circumferential wall surface 541 of the cylindrical member 540 where the through holes 543 are not present. The protrusion 542 of the cylindrical member 540 is fitted in the dropout-preventing slit 536 of the cup member 531, to prevent the cup member 531 from rotating in the circumferential direction, and thereby the cut-out portions 534 do not overlap the through holes 543 in the thickness direction and the through holes 543 are closed before the actuation.

During the operation, the cup member 531 moves by the length L1, and by making the length L1 larger than L3 (L1>L3), the through holes 543 appear below the opening 531*b* and are opened ((b) in FIG. 8).

<Combustion Chamber Cup Depicted in FIG. 9>

The cup member 631 depicted in (a) in FIG. 9 has a bottom surface 631*a*, a circumferential wall surface 632, and an opening 631*b*.

A dropout-preventing slit 636 is formed in the circumferential wall surface 632.

The dropout-preventing slit 636 is formed in the axial direction from a first end 636*a* on the side of the bottom surface 631*a* to a second end 636*b* on the side of the opening 631*b*.

The dropout-preventing slit 636 can be formed at two radially opposite locations in the circumferential wall surface 632.

To reduce weight, the circumferential wall surface 632 has a cut-out portion 634 obtained by cutting out a part of the circumferential wall surface where the dropout-preventing slit 636 is not present. The cut-out portion 634 is obtained by cutting out a circumferential half portion of the circumferential wall surface 632.

A cylindrical member 640 depicted in (a) in FIG. 9 is the same as the cylindrical member 340 depicted in (c) in FIG. 3, except for the presence of through holes 643.

The cylindrical member 640 has a circumferential wall surface 641 and a second end opening 640*b* and also has a first end opening at the other side of the second end opening 640*b*.

A plurality of the through holes 643 are formed equidistantly in the circumferential direction in the circumferential wall surface 641, but the through holes are not formed in part of the circumferential wall surface 641 that faces the cut-out portion 634 when the cylindrical member is combined with the cup member 631.

A protrusion 642 which protrudes radially outward is formed in the circumferential wall surface 641.

The plurality of the through holes 643 are formed at about half of the height of the cylindrical member 640.

The protrusion 642 is present on the side of the second end opening 640*b* with respect to the middle between the second end opening 640*b* and the through holes 643.

The cup member 631 covers the cylindrical member 640 as depicted in (a) in FIG. 9, and these members are used in this state in the gas generator depicted in FIG. 1.

In the gas generator 10 depicted in FIG. 1, the combustion gas can be also ejected from the through holes 643 of the combustion chamber cup in a specific direction by using the combustion chamber cup depicted in (a) in FIG. 9 instead of the second combustion chamber cup 130. For example, the ejection direction can be specified such that the through holes 643 are positioned to be oriented in the direction of increasing distance to the inner circumferential surface of the filter 18.

The cut-out portion 634 of the cup member 631 is positioned in the portion of the circumferential wall surface 641 of the cylindrical member 640 where the through holes 643 are not present. The protrusion 642 of the cylindrical member 640 is fitted in the dropout-preventing slit 636 of the cup member 631 to prevent the cup member 631 from rotating in the circumferential direction, and thereby the cut-out portion 634 does not overlap the through holes 643 in the thickness direction and the through holes 643 are closed before the actuation.

During the operation, the cup member 631 moves by the length L1, and by making the length L1 larger than L3 (L1>L3), the through holes 643 appear below the opening 631*b* and are opened ((b) in FIG. 9).

<Combustion Chamber Cup Depicted in FIG. 10>

The cup member 731 depicted in (a) in FIG. 10 has a bottom surface 731*a*, a circumferential wall surface 732, and an opening 731*b*.

A plurality of through holes 733 are formed equidistantly in the circumferential direction on the side of the bottom surface 731*a* in the circumferential wall surface 732.

A dropout-preventing slit 736 is formed in a portion of the circumferential wall surface 732 where the through holes 733 are not formed.

The dropout-preventing slit 736 is formed in the axial direction from a first end 736*a* on the side of the bottom surface 731*a* to a second end 736*b* on the side of the opening 731*b*. The dropout-preventing slit 736 can be formed at two radially opposite locations in the circumferential wall surface 732.

The cylindrical member 440 is the same as the cylindrical member 440 depicted in FIG. 7.

The cup member 731 covers the cylindrical member 440 as depicted in (a) in FIG. 10, and these members are used in this state in the gas generator depicted in FIG. 1 or FIG. 6.

In this case, the adjustment is made such that L1>L3 and L1>L4.

The length L1 corresponds to a length obtained by subtracting the thickness of the protrusion 442 from the axial length of the dropout-preventing slit 736.

The length L3 is a length from the upper end of the through hole 443 of the cylindrical member to the opening 731*b* of the cup member when the cup member 731 is attached to the cylindrical member 440 with the protrusion 442 positioned at the first end before the actuation.

The length L4 is a length from the lower end of the through hole 733 of the cup member to the second end opening 440*b* of the cylindrical member when the cup member 731 is attached to the cylindrical member 440 with the protrusion 442 positioned at the first end before the actuation.

During the operation, the cup member 731 moves by the length L1.

By making the length L1 larger than the abovementioned length L3, the through holes 443 of the cylindrical member appear below the opening 731*b* of the cup member and are opened. By making the length L1 larger than the abovementioned length L4, the through holes 733 of the cup member appear above the second end opening 440*b* of the cylindrical member and are opened ((b) in FIG. 10).

<Combustion Chamber Cup Depicted in FIG. 11>

A cup member 831 depicted in (a) in FIG. 11 has a bottom surface 831*a*, a circumferential wall surface 832, and an opening 831*b*.

A plurality of through holes 833 are formed equidistantly in the circumferential direction on the side of the bottom surface 831*a* in the circumferential wall surface 832.

A dropout-preventing slit 836 is formed in a portion of the circumferential wall surface 832 where the through holes 833 are not formed.

The dropout-preventing slit 836 is formed in the axial direction from a first end 836*a* on the side of the bottom surface 831*a* to a second end 836*b* on the side of the opening 831*b*.

The dropout-preventing slit 836 can be formed in two radially opposite locations in the circumferential wall surface 832.

The circumferential wall surface 832 has a cut-out portion 834 obtained by cutting out a part of the circumferential wall surface where the dropout-preventing slit 836 and the through holes 833 are not present. The cut-out portion 834 is formed also on the radially opposite side in the circumferential wall surface 832.

The two cut-out portions 834 are formed to facilitate radial outward spreading of the opening 831*b* of the cup member 831 and also to reduce weight.

The cut-out portions 834 may have any shape that demonstrates the aforementioned function, for example, a square, rectangular, trapezoidal, or partially circular (semicircular, etc.) shape.

In (a) in FIG. 11, the dropout-preventing slit 836 and the cut-out portions 834 are formed coaxially, but they may not be formed coaxially.

The cylindrical member 540 is the same as the cylindrical member 540 depicted in FIG. 8.

The cup member 831 covers the cylindrical member 540 as depicted in (a) in FIG. 11 and these members are used in this state in the gas generator depicted in FIG. 1 or FIG. 6.

The cut-out portions 834 of the cup member 831 are positioned in the portions of the circumferential wall surface 541 of the cylindrical member 540 where the through holes 543 are not present. The protrusion 542 of the cylindrical member 540 is fitted in the dropout-preventing slit 836 of the cup member 831 to prevent the cup member 831 from rotating in the circumferential direction, and thereby the cut-out portions 834 do not overlap the through holes 543 in the thickness direction and the through holes 543 are closed before the actuation.

L1, L3, and L4 are adjusted such that L1>L3 and L1>L4.

The length L1 corresponds to a length obtained by subtracting the thickness of the protrusion 542 from the axial length of the dropout-preventing slit 836.

The length L3 is a length from the upper end of the through hole 543 of the cylindrical member to the opening 831*b* of the cup member when the cup member 831 is attached to the cylindrical member 540 with the protrusion 542 positioned at the first end before the actuation.

The length L4 is a length from the lower end of the through hole 833 of the cup member to the second end opening 540*b* of the cylindrical member when the cup member 831 is attached to the cylindrical member 440 with the protrusion 542 positioned at the first end before the actuation.

During the operation, the cup member 831 moves by the length L1.

By making the length L1 larger than the abovementioned length L3, the through holes 543 of the cylindrical member appear below the opening 831*b* of the cup member and are opened. By making the length L1 larger than the abovementioned length L4, the through holes 833 of the cup member appear above the second end opening 540*b* of the cylindrical member and are opened ((b) in FIG. 11).

<Combustion Chamber Cup Depicted in FIG. 12>

The cup member 931 depicted in (a) in FIG. 12 has a bottom surface 931*a*, a circumferential wall surface 932, and an opening 931*b*.

A plurality of through holes 933 is formed equidistantly in the circumferential direction on the side of the bottom surface 931a in the circumferential wall surface 932.

A dropout-preventing slit 936 is formed in a portion of the circumferential wall surface 932 where the through holes 933 are not formed.

The dropout-preventing slit 936 is formed in the axial direction from a first end 936a on the side of the bottom surface 931a to a second end 936b on the side of the opening 931b.

The dropout-preventing slit 936 can be formed at two radially opposite locations in the circumferential wall surface 932.

To reduce weight, the circumferential wall surface 932 has a cut-out portion 934 obtained by cutting out part of the circumferential wall surface where the dropout-preventing slit 936 and the through holes 933 are not present. The cut-out portion 934 is obtained by cutting out a circumferential half portion of the circumferential wall surface 932.

The cylindrical member 640 depicted in (a) in FIG. 12 is the same as the cylindrical member 640 depicted in (a) in FIG. 9.

The cup member 931 covers the cylindrical member 640 as depicted in (a) in FIG. 12, and these members are used in this state as the second combustion chamber cup 130 in the gas generator depicted in FIG. 1, in the same manner as in the combustion chamber cup including the cup member 631 and the cylindrical member 640 in FIG. 9.

The cut-out portions 934 of the cup member 931 are positioned in the portion of the circumferential wall surface 641 of the cylindrical member 640 where the through holes 643 are not present. The protrusion 642 of the cylindrical member 640 is fitted in the dropout-preventing slit 936 of the cup member 931 to prevent the cup member 931 from rotating in the circumferential direction, and thereby the cut-out portion 934 does not overlap the through holes 643 in the thickness direction and the through holes 643 are closed before the actuation.

L1, L3, and L4 are adjusted such that L1>L3 and L1>L4.

The length L1 corresponds to a length obtained by subtracting the thickness of the protrusion 642 from the length of the dropout-preventing slit 936.

The length L3 is a length from the upper end of the through hole 643 of the cylindrical member to the opening 931b of the cup member when the cup member 931 is attached to the cylindrical member 640 with the protrusion 642 positioned at the first end before the actuation.

The length L4 is a length from the lower end of the through hole 933 of the cup member to the second end opening 640b of the cylindrical member when the cup member 931 is attached to the cylindrical member 640 with the protrusion 642 positioned at the first end before the actuation.

During the operation, the cup member 931 moves by the length L1.

By making the length L1 larger than the abovementioned length L3, the through holes 643 of the cylindrical member appear below the opening 931b of the cup member and are opened. By making the length L1 larger than the length L4, the through holes 933 of the cup member appear above the second end opening 640b of the cylindrical member and are opened ((b) in FIG. 12).

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
two combustion chambers in a housing provided with a gas discharge port,
the two combustion chambers being separated into an inner combustion chamber which is inside a combustion chamber cup disposed in the housing, and an outer combustion chamber which is outside the combustion chamber cup,
the combustion chamber cup including a combination of a cup member and a cylindrical member,
the cup member having, in a circumferential wall surface thereof, a dropout-preventing slit formed in an axial direction from a first end on the side of a bottom surface to a second end on the side of an opening,
the cylindrical member having a first end opening fixed to a bottom plate of the housing and a protrusion protruding radially outward in a circumferential wall surface thereof,
the circumferential wall surface of the cup member having a plurality of through holes formed in a circumferential direction, and
the cup member covering a second end opening of the cylindrical member, and the bottom surface of the cup member being positioned on the side of a top plate of the housing;
the plurality of the through holes of the cup member being closed due to the circumferential wall surface of the cup member being radially opposite to and in contact with the circumferential wall surface of the cylindrical member when the protrusion of the cylindrical member is fitted at the first end of the dropout-preventing slit,
at the time of actuation, the plurality of through holes of the cup member being opened when the cup member moves in an axial direction and stops with the protrusion abutting against the second end, shifted from the first end of the dropout-prevention slit.

2. A gas generator comprising:
two combustion chambers in a housing provided with a gas discharge port,
the two combustion chambers being separated into an inner combustion chamber which is inside a combustion chamber cup disposed in the housing, and an outer combustion chamber which is outside the combustion chamber cup,
the combustion chamber cup including a combination of a cup member and a cylindrical member,
the cup member having, in a circumferential wall surface thereof, a dropout-preventing slit formed in an axial direction from a first end on the side of a bottom surface to a second end on the side of an opening,
the cylindrical member having a first end opening fixed to a bottom plate of the housing and a protrusion protruding radially outward in a circumferential wall surface thereof,
the circumferential wall surface of the cylindrical member having a plurality of through holes formed in a circumferential direction, and
the cup member covering a second end opening of the cylindrical member, and the bottom surface of the cup member being positioned on the side of a top plate of the housing;

the plurality of the through holes of the cylindrical member being closed due to the circumferential wall surface of the cup member being radially opposite to and in contact with the circumferential wall surface of the cylindrical member when the protrusion of the cylindrical member is fitted at the first end of the dropout-preventing slit, at the time of actuation, the plurality of through holes of the cylindrical member being opened when the cup member moves in an axial direction and stops with the protrusion abutting against the second end, shifted from the first end of the dropout-prevention slit.

3. A gas generator comprising:
two combustion chambers in a housing provided with a gas discharge port,
the two combustion chambers being separated into an inner combustion chamber which is inside a combustion chamber cup disposed in the housing, and an outer combustion chamber which is outside the combustion chamber cup,
the combustion chamber cup including a combination of a cup member and a cylindrical member,
the cup member having, in a circumferential wall surface thereof, a dropout-preventing slit formed in an axial direction from a first end on the side of a bottom surface to a second end on the side of an opening,
the cylindrical member having a first end opening fixed to a bottom plate of the housing and a protrusion protruding radially outward in a circumferential wall surface thereof,
both the circumferential wall surface of the cup member and the circumferential wall surface of the cylindrical member having a plurality of through holes formed in a circumferential direction, and
the cup member covering a second end opening of the cylindrical member, and the bottom surface of the cup member being positioned on the side of a top plate of the housing;
both the plurality of the through holes of the cup member and the plurality of the through holes of the cylindrical member being closed due to the circumferential wall surface of the cup member being radially opposite to and in contact with the circumferential wall surface of the cylindrical member when the protrusion of the cylindrical member is fitted at the first end of the dropout-preventing slit,
at the time of actuation, both the plurality of through holes of the cup member and the plurality of the through holes of the cylindrical member being opened when the cup member moves in an axial direction and stops with the protrusion abutting against the second end, shifted from the first end of the dropout-prevention slit.

4. The gas generator according to claim 1, wherein the protrusion, which protrudes radially outward from the circumferential wall surface of the cylindrical member, is obtained by cutting axially the circumferential wall surface of the second end opening in two circumferentially spaced locations and bending outwardly.

5. The gas generator according to claim 1, wherein the protrusion, which protrudes radially outward from the circumferential wall surface of the cylindrical member, is obtained by cutting axially the circumferential wall surface of the second end opening, further cutting in the circumferential direction, and bending outwardly.

6. The gas generator according to claim 1, wherein the protrusion, which protrudes radially outward from the circumferential wall surface of the cylindrical member, is a separate member fixed to the circumferential wall surface.

7. The gas generator according to claim 1, wherein the cup member has, in addition to the dropout-preventing slit formed in the axial direction from the first end on the side of the bottom surface to the second end on the side of the opening,
a connection slit formed in the circumferential direction from the second end of the dropout-preventing slit, and
an introducing slit formed from the connection slit to the opening of the cup member.

8. The gas generator according to claim 1, wherein
the dropout-preventing slit of the cup member is formed in the axial direction from the first end on the side of the bottom surface to the second end on the side of the opening in the circumferential wall surface, and the second end does not reach the opening of the cup member,
the circumferential wall surface of the cup member has a cut-out portion which is obtained by cutting out a part of the circumferential wall surface where the dropout-preventing slit and the through holes are not present, and
the cut-out portion is a combination of a first cut-out portion obtained by cutting out the part of the circumferential wall surface including the opening of the cup member and a second cut-out portion obtained by cutting out the part of the circumferential wall surface which is radially opposite to the first cut-out portion.

9. The gas generator according to claim 2, wherein
at least the circumferential wall surface of the cylindrical member has the plurality of the through holes formed in the circumferential direction,
the circumferential wall surface of the cup member has a cut-out portion in one or not less than two locations, the cut-out portion being obtained by cutting out a part of the circumferential wall surface of the cup member, which is not opposite, in the thickness direction, to the plurality of the through holes of the cylindrical member, and
the cut-out portion is obtained by cutting out part of the circumferential wall surface including the opening of the cup member.

10. The gas generator according to claim 2, wherein the protrusion, which protrudes radially outward from the circumferential wall surface of the cylindrical member, is obtained by cutting axially the circumferential wall surface of the second end opening in two circumferentially spaced locations and bending outwardly.

11. The gas generator according to claim 2, wherein the protrusion, which protrudes radially outward from the circumferential wall surface of the cylindrical member, is obtained by cutting axially the circumferential wall surface of the second end opening, further cutting in the circumferential direction, and bending outwardly.

12. The gas generator according to claim 2, wherein the protrusion, which protrudes radially outward from the circumferential wall surface of the cylindrical member, is a separate member fixed to the circumferential wall surface.

13. The gas generator according to claim 3, wherein the protrusion, which protrudes radially outward from the circumferential wall surface of the cylindrical member, is obtained by cutting axially the circumferential wall surface of the second end opening in two circumferentially spaced locations and bending outwardly.

14. The gas generator according to claim 3, wherein the protrusion, which protrudes radially outward from the circumferential wall surface of the cylindrical member, is obtained by cutting axially the circumferential wall surface of the second end opening, further cutting in the circumferential direction, and bending outwardly.

15. The gas generator according to claim 3, wherein the protrusion, which protrudes radially outward from the circumferential wall surface of the cylindrical member, is a separate member fixed to the circumferential wall surface.

16. The gas generator according to claim 3, wherein
the dropout-preventing slit of the cup member is formed in the axial direction from the first end on the side of the bottom surface to the second end on the side of the opening in the circumferential wall surface, and the second end does not reach the opening of the cup member,
the circumferential wall surface of the cup member has a cut-out portion which is obtained by cutting out a part of the circumferential wall surface where the dropout-preventing slit and the through holes are not present, and
the cut-out portion is a combination of a first cut-out portion obtained by cutting out the part of the circumferential wall surface including the opening of the cup member and a second cut-out portion obtained by cutting out the part of the circumferential wall surface which is radially opposite to the first cut-out portion.

17. The gas generator according to claim 3, wherein
at least the circumferential wall surface of the cylindrical member has the plurality of the through holes formed in the circumferential direction,
the circumferential wall surface of the cup member has a cut-out portion in one or not less than two locations, the cut-out portion being obtained by cutting out a part of the circumferential wall surface of the cup member, which is not opposite, in the thickness direction, to the plurality of the through holes of the cylindrical member, and
the cut-out portion is obtained by cutting out part of the circumferential wall surface including the opening of the cup member.

* * * * *